US008615322B2

(12) United States Patent
Thompson et al.

(10) Patent No.: US 8,615,322 B2
(45) Date of Patent: Dec. 24, 2013

(54) EFFICIENT MOVES VIA DUAL PICKERS

(75) Inventors: Nathan Christopher Thompson, Boulder, CO (US); Matthew Thomas Starr, Lafayette, CO (US)

(73) Assignee: Spectra Logic Corporation, Boulder, CO (US)

( * ) Notice: Subject to any disclaimer, the term of this patent is extended or adjusted under 35 U.S.C. 154(b) by 97 days.

(21) Appl. No.: 13/279,002

(22) Filed: Oct. 21, 2011

(65) Prior Publication Data

US 2012/0076621 A1 Mar. 29, 2012

Related U.S. Application Data

(63) Continuation-in-part of application No. 12/891,311, filed on Sep. 27, 2010.

(51) Int. Cl.
*G06F 7/00* (2006.01)
*B65G 1/00* (2006.01)

(52) U.S. Cl.
USPC ........... 700/214; 700/213; 700/215; 700/220; 700/221; 414/273

(58) Field of Classification Search
None
See application file for complete search history.

(56) References Cited

U.S. PATENT DOCUMENTS

| | | | | |
|---|---|---|---|---|
| 5,646,918 A * | 7/1997 | Dimitri et al. | ............. | 369/30.31 |
| 5,818,723 A | 10/1998 | Dimitri | | |
| 5,956,301 A * | 9/1999 | Dimitri et al. | ............. | 369/30.31 |
| 6,304,524 B1 | 10/2001 | Gallo et al. | | |
| 6,401,011 B1 | 6/2002 | Hashimukai | | |
| 6,570,734 B2 | 5/2003 | Ostwald et al. | | |
| 6,671,580 B2 | 12/2003 | Campbell et al. | | |
| 6,691,001 B2 | 2/2004 | Ostwald et al. | | |
| 6,804,580 B1 | 10/2004 | Stoddard | | |
| 7,076,327 B1 | 7/2006 | Desai et al. | | |
| 7,131,025 B2 | 10/2006 | Tarcea et al. | | |
| 7,211,980 B1 | 5/2007 | Bruemmer et al. | | |
| 7,251,606 B2 | 7/2007 | Horinaka et al. | | |
| 7,263,596 B1 * | 8/2007 | Wideman et al. | ............. | 711/209 |
| 7,308,529 B1 | 12/2007 | Desai | | |
| 7,370,173 B2 | 5/2008 | Justiss et al. | | |
| 2003/0037061 A1 | 2/2003 | Sastri et al. | | |
| 2004/0181388 A1 | 9/2004 | Yip et al. | | |
| 2006/0132964 A1 | 6/2006 | Lau et al. | | |
| 2008/0114936 A1 | 5/2008 | Desai | | |

* cited by examiner

*Primary Examiner* — Yolanda Cumbess
(74) *Attorney, Agent, or Firm* — Kenneth Altshuler

(57) ABSTRACT

A storage library is described that includes a shelf system adapted to support a number of tape cartridges. The storage library further includes a tape drive adapted to read and write data to and from tape cartridges. The storage library further possesses a single tape picker device that is adapted to hold two tape cartridges at the same time facilitating an exchange of a first tape cartridge intended to be loaded in the tape drive with a second tape cartridge ready to be removed from the tape drive with a single tape picker device.

19 Claims, 17 Drawing Sheets

EFFICIENT MOVES VIA DUAL PICKERS

CROSS-REFERENCE TO RELATED APPLICATIONS

This application is a Continuation-in-Part Application which claims priority to and the benefit of U.S. patent application Ser. No. 12/891,311 entitled EFFICIENT MAGAZINE MOVES, filed on Sep. 27, 2010, the entire disclosure of which is hereby incorporated by reference.

BACKGROUND OF THE INVENTION

1. Field of the Invention

The present embodiments are directed to a data cartridge magazine library that is useful in storing data on a recording medium located in a cartridge and/or retrieving data from such a recording medium.

2. Description of Related Art

Presently, data cartridge magazine libraries transfer tape cartridges via a data cartridge magazine between a shelf system and a tape drive. If access to a target tape cartridge is required, for reading and/or writing data, the target tape cartridge disposed in a magazine is moved from a shelf system to the target tape drive where the target tape cartridge is loaded therein. Following any access requirement, the tape cartridge is returned to the shelf system via the corresponding magazine before a different tape cartridge often in a different magazine is accessed. These basic operations are essentially repeated each and every time a new tape cartridge is accessed.

It is to innovations related to this subject matter that the claimed invention is generally directed.

SUMMARY OF THE INVENTION

The present embodiments generally relate to a cartridge magazine-based library that reduces the number of robotic motion steps between a shelf system and drive by incorporating a transitional repository that temporarily holds cartridges near the drive. Some embodiments of the present invention contemplate a data storage library comprising a picker device with dual pickers whereby one picker temporarily holds a first data cartridge after being ejected from a drive and prior to being disposed in a magazine, while the other picker holds a second data cartridge that is removed from the magazine and intended to be inserted in the drive.

Other embodiments of the present invention can therefore comprise a data storage library comprising: a picker device possessing a first picker and a second picker, the first picker adapted to temporarily hold a first data cartridge after being ejected from a data transfer device and prior to being disposed in an accommodating slot while the second picker is holding a second data cartridge prior to inserting the second data cartridge in the data transfer device.

Yet other embodiments of the present invention can therefore comprise a method comprising: providing a data storage library that comprises a picker device that is moved within the data storage library via a robotic transporter, the picker device possessing a first picker and a second picker; receiving a first instruction from a host to unload a first portable data cartridge from a data transfer device and dispose the first portable data cartridge in a first data cartridge slot; queuing the first instruction; replying to the host that the first instruction is carried out, even though the first instruction has only been queued; receiving a second instruction to move a second portable data cartridge from a second data cartridge slot and load the second portable data cartridge in the data transfer device after the replying step; grasping the second portable data cartridge via the second picker; moving the second portable data cartridge in a position near the data transfer device; removing the first portable data cartridge from the data transfer device via the first picker while the second picker is holding the second portable data cartridge; inserting the second portable data cartridge in the data transfer device via the second picker; disposing the first portable data cartridge in the first data cartridge slot.

And, yet other embodiments of the present invention can therefore comprise a method comprising: providing a data storage library that comprises a picker device that is moved within the data storage library via a robotic transporter; grasping a first portable data cartridge in a first picker while a second portable data cartridge is being held by a second picker, the first picker and the second picker are integrated in the picker device; disposing the first portable data cartridge in a data cartridge slot; inserting the second portable data cartridge in a data transfer device; after the disposing and inserting steps are complete, the first picker is no longer grasping the first portable data cartridge and the second picker is no longer grasping the second portable data cartridge.

DETAILED DESCRIPTION

Figure 1A:
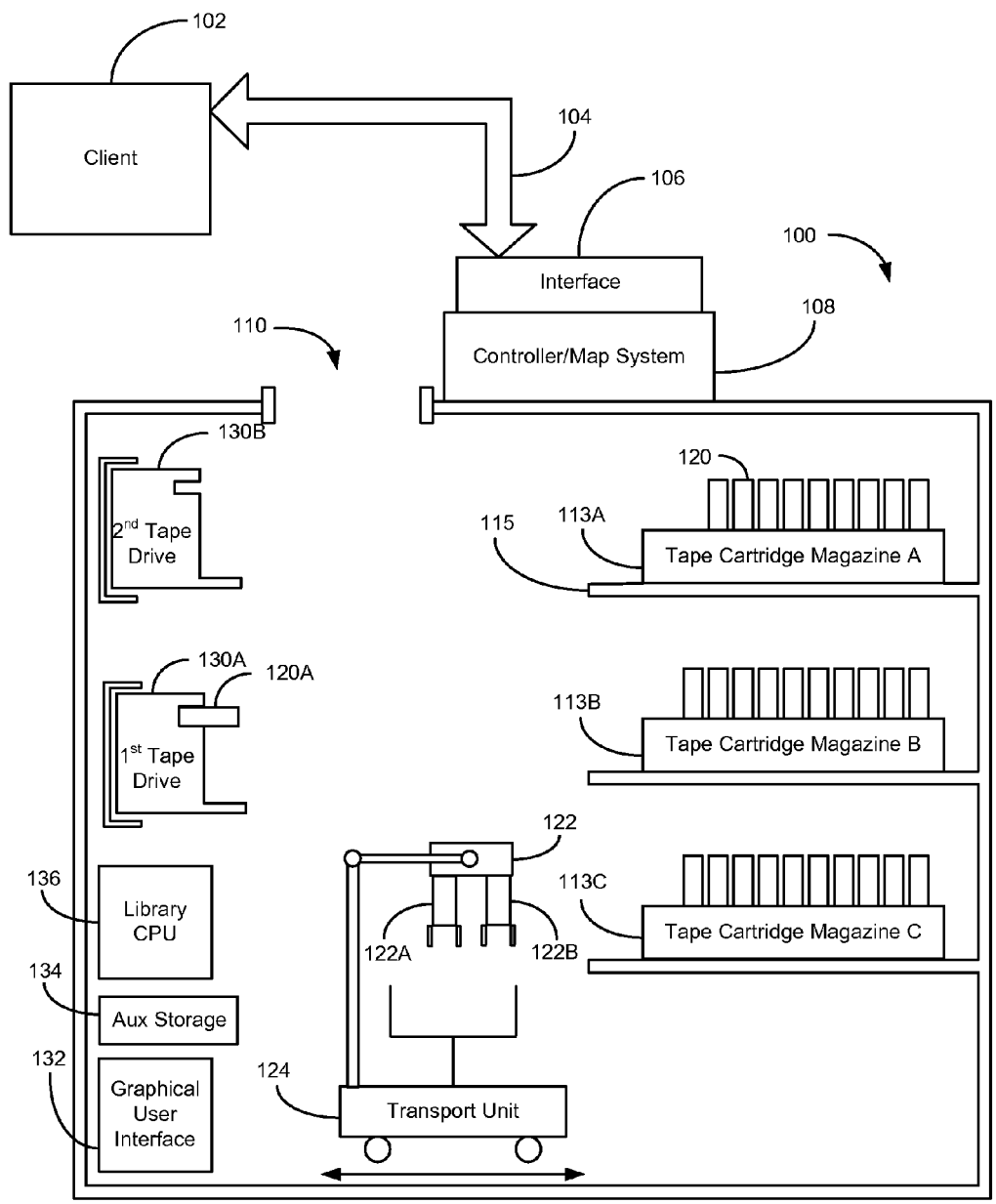
FIGS. 1A and 1B are illustrations of a data storage arrangement constructed in accordance with certain embodiments of the present invention.

Referring to the drawings in general, and more specifically to FIG. 1A, shown therein is an illustration of a data storage arrangement constructed in accordance with various embodiments of the present invention. In what follows, similar or identical structures may be identified using identical callouts.

The data storage arrangement illustrated in FIG. 1A can comprise a user of data 102, such as a client or host, in communication with a data storage library 100. As illustratively shown, the client 102 is in communication with the library 100 via a communication path 104 and the library interface device 106. The library 100 comprises a plurality of tape cartridges 120 disposed in a mobile (or portable) tape cartridge magazine, such as tape cartridge magazine 'A' 113A. Herein, tape cartridge magazine 113 will be used to denote a generic tape cartridge magazine and tape cartridges 120 will be used to denote a generic cartridge. Each tape cartridge magazine 113 contains a plurality of slots (shown in FIG. 2) wherein each slot is adapted to accommodate a tape cartridge 120. The tape cartridge magazine 113 is an embodiment of a portable data cartridge magazine, which certain embodiments contemplate supporting optional kinds of data storage cartridges. A tape cartridge 120 is one embodiment of a portable data storage cartridge, which can include other cartridge devices such as portable solid state devices (Flash drives/solid state drives (SSD), tape drive cleaning cartridges, conventional magnetic disk drives adapted for portability, such as in a cartridge, and other storage elements packaged accordingly, which are distinguishable over storage elements such as stand-alone disks. As such, the portable data cartridges store and retrieve data when coupled to a data transfer device. In the present embodiment, the shelf system 115 is arranged to archive the tape cartridge magazines 113, or independent tape cartridges 120, within the library 100.

Here, the library 100 may be configured to maintain a map of the slots in each magazine 113. More specifically, each slot in a magazine 113 will have a unique identification, such as an address, that is identifiable by the host computer 102 via a map of logical addresses provided by the library 100, such as a map system 108, in this example. A tape cartridge 120 disposed in a particular slot may assume the identity of the particular slot for purposes of the mapping system 108. Hence, a tape cartridge 120 disposed in a third slot having an address mapped as slot number three will assume the identity of slot number three. In other words, the tape cartridge will be mapped and identified as "slot number three" in this example. Optionally, a tape cartridge 120 can be simply identified by a serial number, or other indicia (such as a bar code, medium auxiliary memory information, etc.), and be assigned, or mapped, to a slot, by a host computer 102, for example.

The library 100 can further comprise at least one robotic transporter 124, though in optional library embodiments, multiple transporters exist. The robotic transporter 124 comprises a carriage or other transporting means to carry a tape cartridge magazine 113 from the shelf system 115 to a position ready to load a tape cartridge 120 into a tape drive 130A or 130B. Generically, a tape drive is denoted herein as element 130. An example of a robotic transporter 124 is a robotic device that moves along a rail system via a belt device, a motorized rack and pinion arrangement, a lead screw arrangement, a motor with wheels, etc. The tape cartridge 120 can be loaded into or removed from a tape drive 130 via a picker device 122 that is carried by the robotic transport 124, for example. In greater detail, as shown in the depicted embodiment, the picker device 122 is comprised of two pickers 122A and 122B. Each picker 122A and 122B is adapted to grasp a tape cartridge 120 (or other type of data cartridge) from a magazine 113 and insert the tape cartridge 120 in a tape drive 130, or remove the tape cartridge 120 from a tape drive 130. In the depicted embodiment, the picker device 122 can simultaneously grasp two tape cartridges 120 via the two pickers 122A and 122B. Optional embodiments contemplate three or more pickers fundamentally comprising the picker device 122. In the present embodiment, the client 102 does not have knowledge or, optionally, does not "see" the both of the pickers 220A and 220B because the pickers 220A and 220B do not have independent addresses identifiable by the client 102. In an optional embodiment, the client 102 can identify the pickers 220A and 220B via one or more associated addresses.

With continued reference to a data transfer device, which in the present depicted embodiment is a tape drive 130, a data transfer device facilitates data storage operations (such as, reading and writing) to and from a portable data cartridge device, such as a tape cartridge, solid state memory cartridge, or other portable memory device within the spirit of the embodiments described herein. By way of example, a tape drive 130 is an embodiment of a data transfer device that is adapted to cooperate, or relate, with a portable data storage cartridge. Hence, if a data storage cartridge is a portable solid state device, a data transfer device will likely include a connector device that connects with the solid state device, thus, facilitating storage operations between a client 102 and the portable solid state device, for example. The cooperating relationship between a tape cartridge 120 and a tape drive 130 is one that facilitates data storage operations, such as reading and writing data to and from the cooperating tape cartridge 120. In an optional embodiment, the tape cartridges 120 may be associated with different users of data, which can occur when the storage resources in the library 100 are divided into two or more partitions wherein each partition is associated with the different user of data, for example. The position ready to transfer the tape cartridge 120 into a tape drive from a magazine 113 is a location that facilitates a tape cartridge 120 to be inserted in one of the drives 130A or 130B, such as tape cartridge 120A shown in a cooperating relationship with the first tape drive 130A. In the present embodiment, the position ready to transfer the tape cartridge 120 into a tape drive from a magazine 113 does not require further movement via the robotic transporter 124, rather the picker device 122 moves a cartridge 120 from the magazine 113 to a drive 130. This is also a position that can facilitate the transfer of a tape cartridge 120 to a temporary repository location 112A or 112B just prior to loading the tape cartridge 120 in a tape drive 130. Generically, a temporary repository is denoted herein as element 112.

The library 100 also optionally comprises an entry/exit port 110 whereby tape cartridges 120 or tape cartridge magazine 113 comprising a plurality of tape cartridges 120 can be transferred between an environment external to the library 100 and an environment internal to the library 100. In this embodiment, the library 100 comprises a graphical user interface 132 and an auxiliary memory 134, such as one or more disk drives, solid state memory or other non-volatile memory device/s capable of retaining (storing) relevant information, such as mapping address information of each tape cartridge 120, for example. The library 100 further possesses a computer or Central Processing Unit (CPU) 136 that houses at least on macro controller that actively cooperates with algorithms to orchestrate actions to components within the library 100, for example, over a Computer Area Network (CAN), not shown. The library 100 possesses a controller/map system 108, which can optionally be functionally included with the CPU 136. The controller/map system 108 maintains the addresses of the components mapped out for the client 102 (i.e., tape slot addresses, drive addresses, robot addresses, etc.) to direct operations within the library 100. FIG. 1 is illustrative of basic components used to exemplify inventive embodiments disclosed herein. As one skilled in the art will appreciate, a data storage library will generally include devices and structures not shown in the block illustration of FIG. 1A, such as additional controllers (e.g., those controlling other components in the library including the robotic transporter 124), wiring, cooling systems, switch systems, lighting, protocol bridges, etc.

The client 102, or host computer, identifies (or "sees") the components within the library 100 by transmitting a Small Computer Systems Interface (SCSI) inquiry to scan the storage system's bus (not shown) to discover what devices comprise the storage system 100. Optionally, the map system 108 can provide the information directly to the client 102. An inquiry can be a client 102 effectively asking the storage system 100 "who are you?" and "what are you?" The storage system 100 can be displayed showing a plurality of tape cartridges 120 located at specified slot addresses and showing that there are two tape drives 130A and 130B at designated addresses and a transporter 124 and/or picker device 122 at designated addresses that are able to receive instructions from the client 102, for example.

Figure 1B:
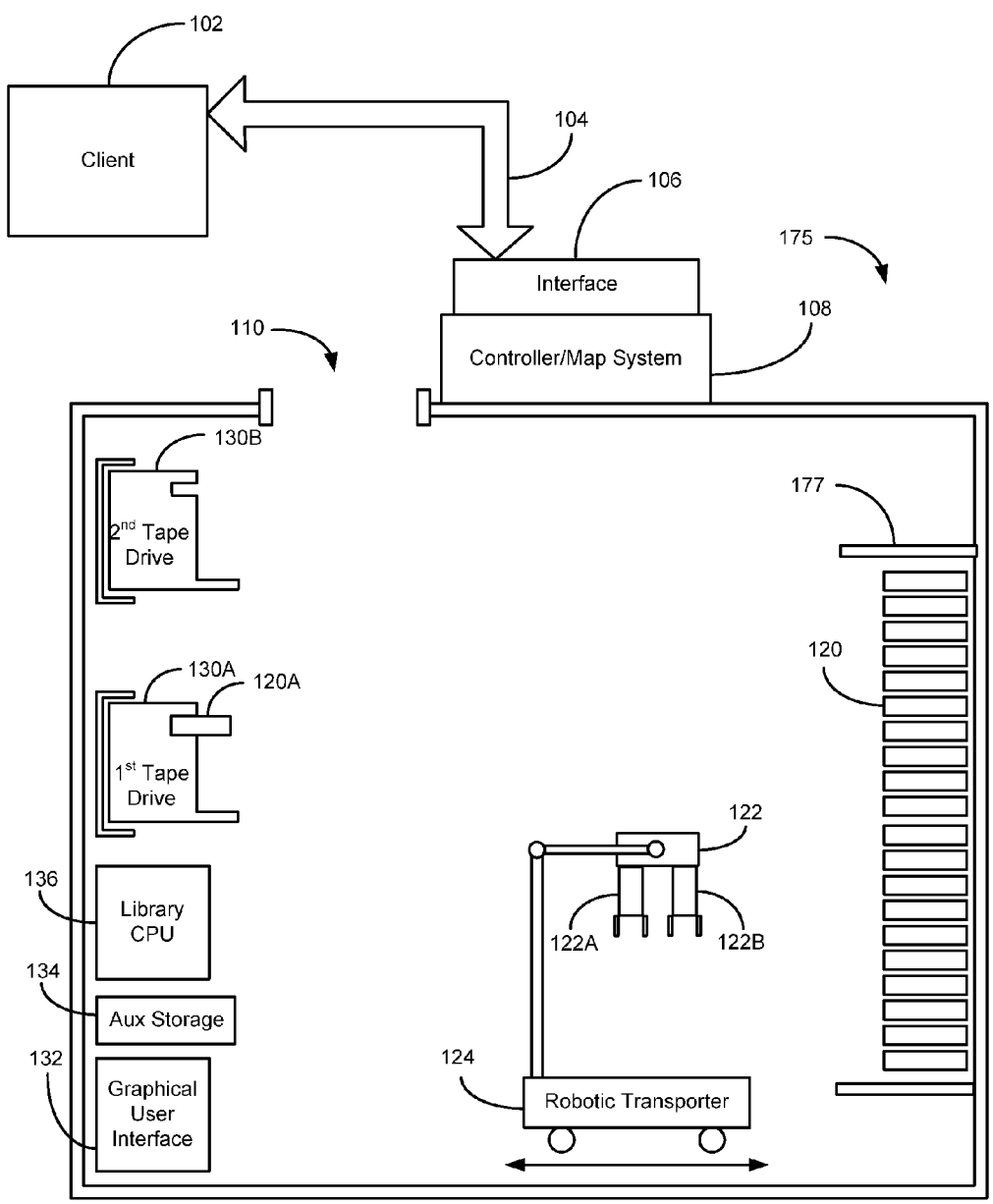

FIG. 1B shows a tape cartridge library 175 that supports individual tape cartridges 120 in a shelf system 177. Embodiments of the picker device 120A and 120B can be optionally practiced in the tape cartridge library preferably in conjunction with FIG. 7A-FIG. 7F, using the shelf system 177 instead of a mobile magazine 113.

Figure 2A:
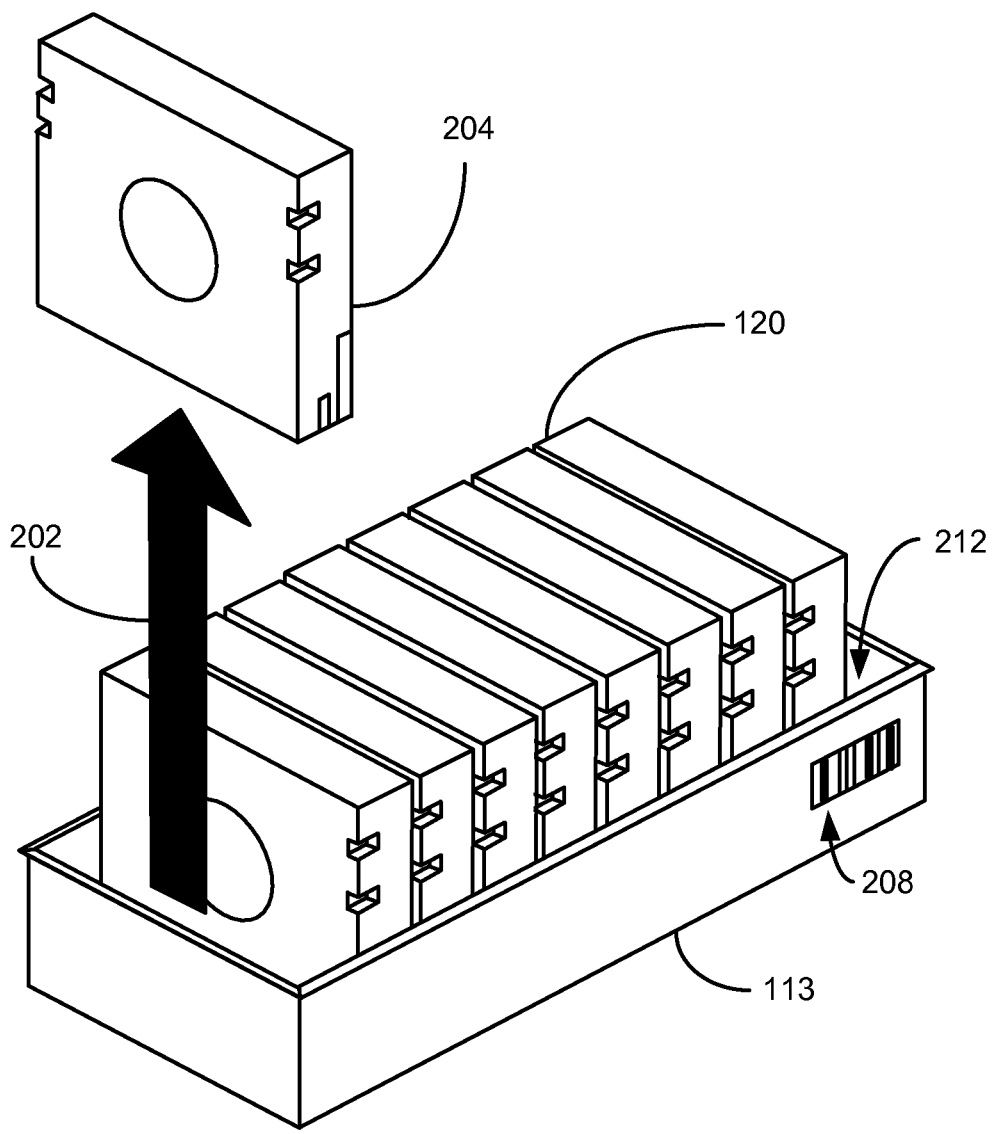
FIG. 2A shows a perspective illustration of a tape magazine supporting tape cartridges constructed in accordance with certain embodiments of the present invention.

With reference to FIG. 2A, shown therein are tape cartridges 120 supported by a tape cartridge magazine 113. In more detail, a tape cartridge 120, such as an LTO-3 category tape cartridge, comprises magnetic tape that is capable of storing digital data written by a compatible drive 130 or 132, such as an LTO-3 tape drive manufactured by IBM, when coupled (in cooperation) to read and write data (i.e., loaded) with the tape cartridge 120, as shown in FIG. 1. The tape cartridge magazine 113 is illustratively shown populated with a plurality of tape cartridges 120. A tape cartridge 120 can be removed from the tape cartridge magazine 113, as shown by the arrow 202, and inserted into a tape drive 130 by means of a picker device 142, shown in FIG. 1. Disposed on the tape cartridge magazine 113 is a bar code identifier 208 for identifying the tape cartridge magazine 113, which has utility should the tape cartridge magazine 113 be archived in a media pack storage vault that is remote from a library (i.e., not in a library), for example. In some embodiments, all tape cartridges 120 contain a Medium Auxiliary Memory (MAM) device (not shown), however, in alternative embodiments, some tape cartridges may not contain a MAM device. One example of a MAM device is a flash memory device that is activated by radio frequency. In other embodiments of the present invention, the magazine 113 can comprise a magazine auxiliary memory device (not shown) that is capable of containing information (such as tape slot address mapping information, i.e., a tape cartridge corresponding to "slot-1" can retain the identity of "slot-1" on the tape cartridge's MAM) from at least one of the data cartridges 120 that the magazine 113 supports. The magazine auxiliary memory device 112 can receive information that is maintained on the tape cartridge MAM devices contained via one or more MAM device readers/writers associated with a tape drive 130, or some reader not associated with a tape drive 130, for example. Information from the MAM devices can be read and immediately transmitted to the magazine auxiliary memory device, or alternatively, the information of each MAM device can be stored on the auxiliary storage device 134 and then transferred to the magazine auxiliary memory device, just to name two examples.

A MAM device, in one embodiment, is parceled into three regions in which data can be stored: a medium device region, which contains information such as a serial number (or some information corresponding to a tape's bar code, for example), a device region which can contain information from the tape drive such as load count, and host/vendor unique region wherein information such as history and/or performance data related to the cartridge 120 can be stored. The information in the regions can be supplemented with new information via an address related to the arrangement of available storage space in the cartridge MAM device. Optionally, the information can be read by an auxiliary memory reader, such as a MAM reader, and reassembled with additional information and stored on the MAM device as the reassembled version, just to name two examples. In another example, if the storage limit is reached in the MAM device, such as the host/vendor data in the host/vendor unique region, the host/vendor data can be read and stored in an auxiliary storage space, such as the auxiliary memory 134, and the host/vendor unique region purged and made available for new information. In another example, the host/vendor data can be compressed with algorithms to decompress residing in the library 100 or user of data, for example.

Figure 2B:
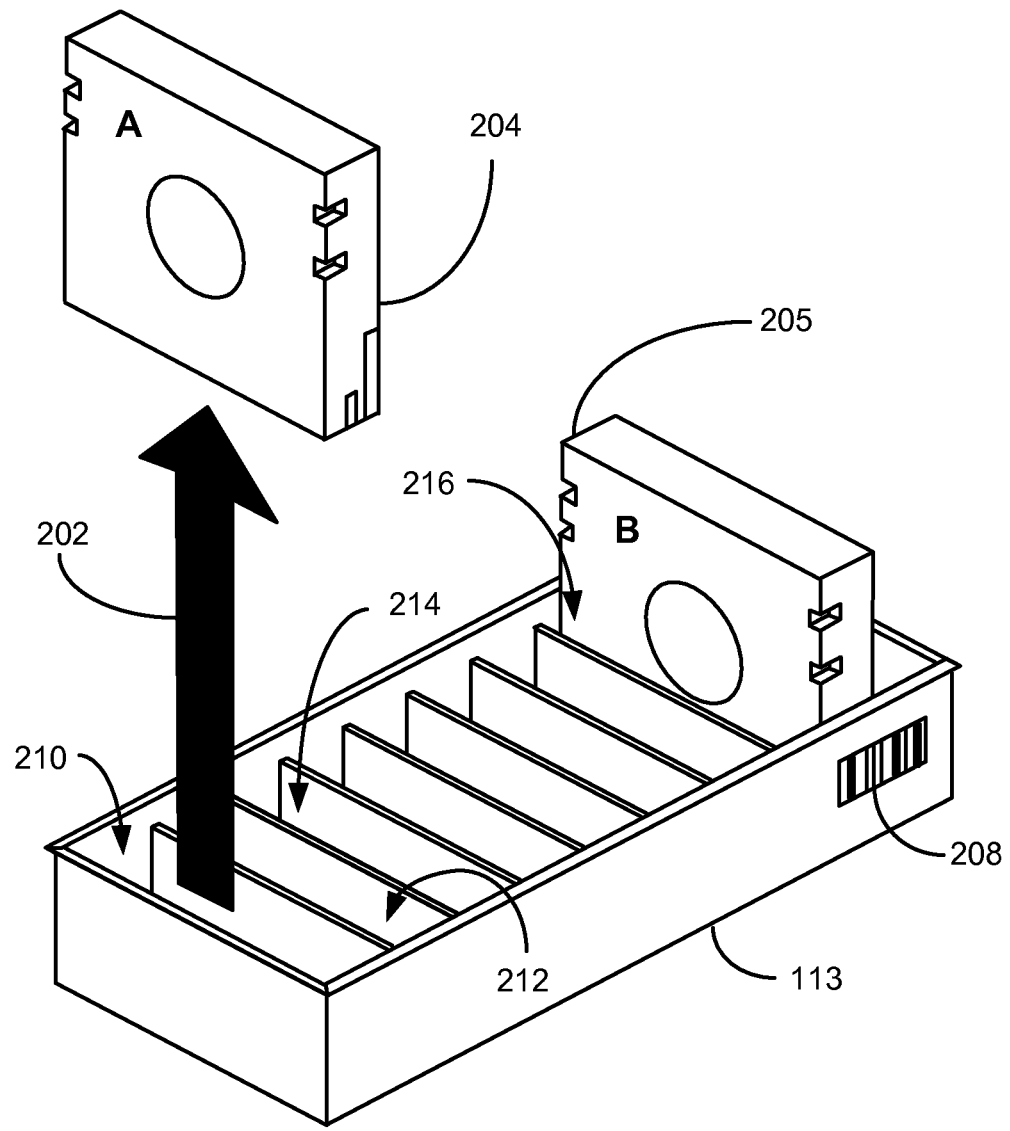
FIG. 2B shows a perspective illustration of a tape magazine revealing tape cartridge slots constructed in accordance with certain embodiments of the present invention.

FIG. 2B is an illustration of a mostly empty magazine 113 consistent with embodiments of the present invention. Here, in one exemplary embodiment, the magazine 113 possesses a plurality of slots, such as a first slot 210, a second slot 212, a third slot 214, etc. The depicted magazine 113 can be mapped to a client 102 as possessing slots one through nine. The tape cartridge "A" 204 originated from the first slot 210 and, therefore, is also mapped to correspond to the first slot address, or more specifically, the tape cartridge 204 with an address associated with the first slot 210. Tape cartridge "B" 205 is the only other tape cartridge shown in FIG. 2B and is disposed in the eighth slot 216. The tape cartridge "B" 205 resides in the eighth slot 216 and, therefore, is also mapped as corresponding to the eighth slot 216 address, or more specifically, the tape cartridge 205 possessing an address associated with the eighth slot 216.

Figure 3A:
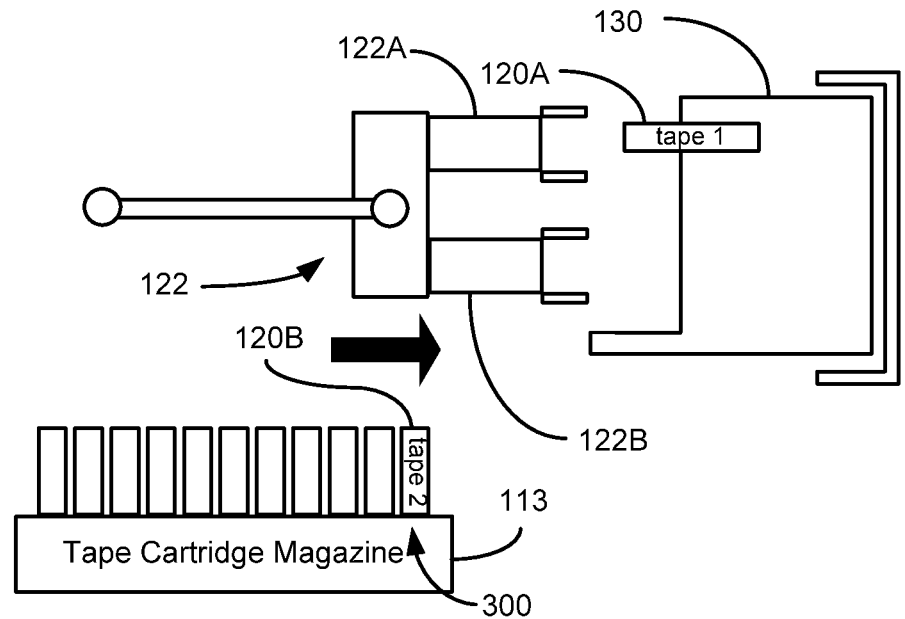
FIGS. 3A-3F are illustrations of a transporter and picker device possessing dual pickers cooperating with a data transfer device and a portable cartridge magazine constructed in accordance with an embodiment of the present invention.
Figure 3B:
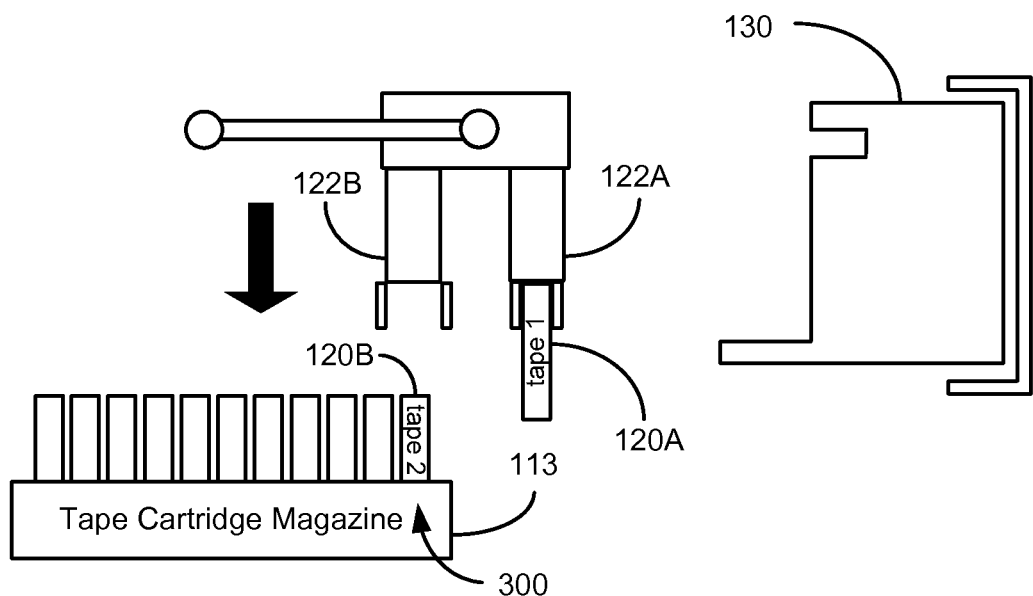
Figure 3C:
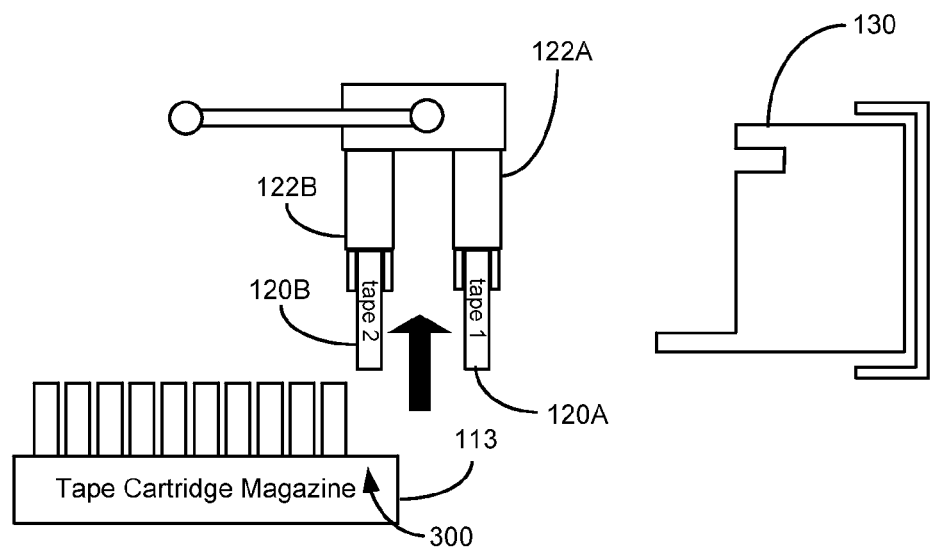
Figure 3D:
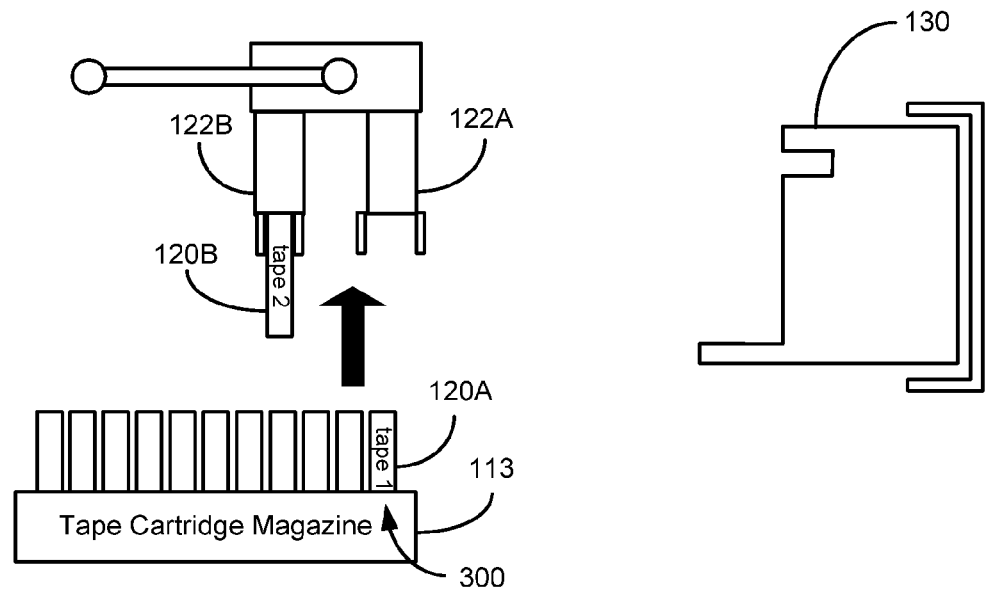
Figure 3E:
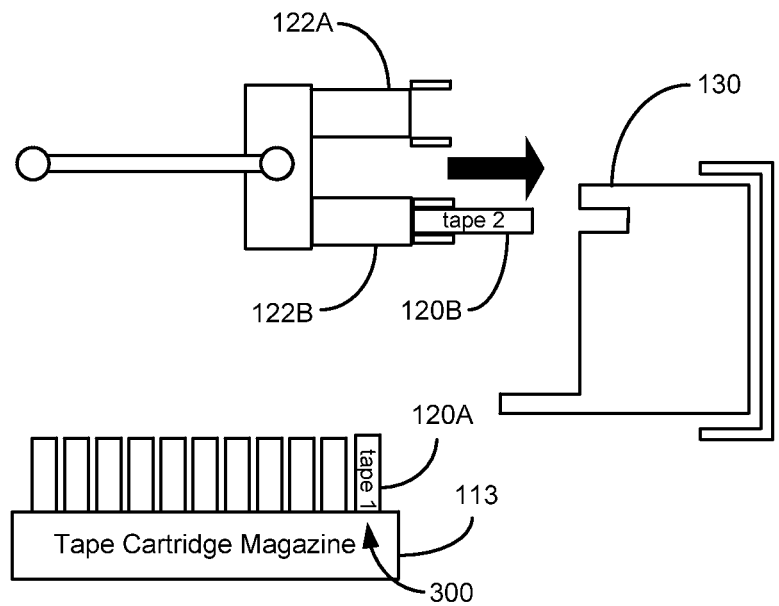
Figure 3F:
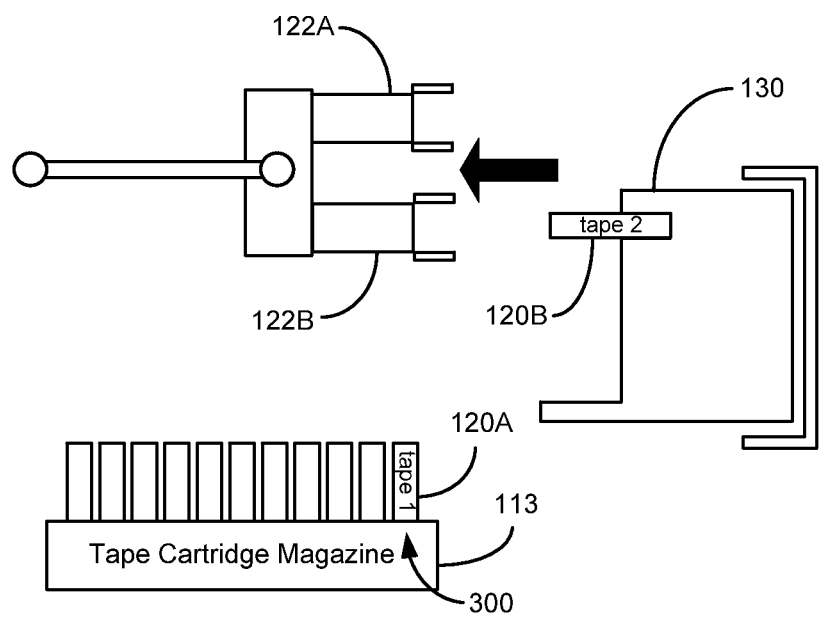
Figure 4:
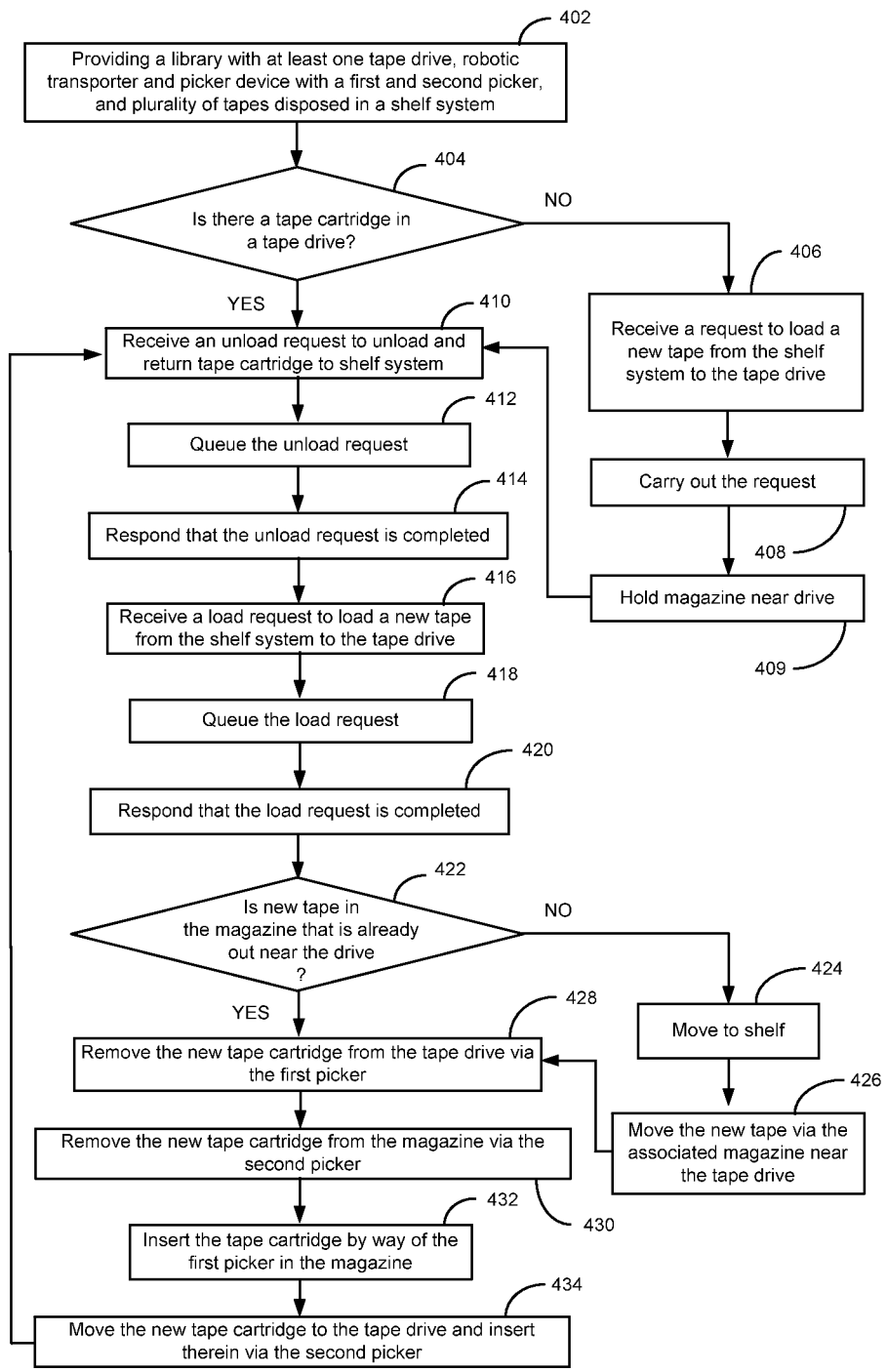
FIG. 4 is a block diagram of a method consistent with certain embodiments of the present invention.

FIG. 4 illustrates an embodiment of a method for efficiently moving tape cartridges 120 within a storage library 100 by essentially swapping a first tape cartridge 120A with a second tape cartridge 120B in relation to a commonly used a tape drive 130. FIG. 4 is described in conjunction with FIGS. 3A-3F and FIG. 1A. It should be recognized that the steps presented in the described embodiments of the present invention do not necessarily require any particular sequence unless otherwise stated. With reference to step 402 in conjunction with FIG. 1A, the library 100 is generally provided with a first tape drive 130A and a second tape drive 130B a robotic transporter 124 with a picker device 122 having a first picker 122A and a second picker 122B, and a plurality of tape cartridges 120 disposed in a magazine 113 located at the shelf system 115. A client 102 queries the library 100 to determine the library's configuration. As shown by the diamond 404, if there is a tape cartridge 120 present in a target tape drive 130, then proceed to step 410, otherwise proceed to step 406. Step 406 is a block showing the receipt of a request to move a first tape cartridge 120A from the associated slot and load the first tape cartridge 120A in the tape drive 130. The first tape cartridge 120A is identified by the host 120 via an associated logical address, hereinafter, for simplicity, the logical address will be slot-1. The load request is simplified herein for ease of illustration, however, in actuality, there is a sequence of instructions that occurs, including identifying and moving the first tape cartridge 120A from the shelf system 115 (more specifically slot 1) to loading the first tape cartridge 120A in an engaged, cooperating relationship with the tape drive 130 ready to perform read/write operations, etc. Step 408 essentially carries out the request to move the first tape cartridge 120A, which is disposed in the magazine 113, from the shelf system 115 and load the first tape cartridge 120A in the tape drive 130. In an optional embodiment, the magazine 113 is not put away, rather, it is held near the tape drive 130 (step 409). Certain other embodiments contemplate the magazine 113 being put away back to the shelf system 115 from where the magazine came. When the first tape cartridge 120A has completed all storage operations for the client 102, then proceed to step 410. Here, the library 100 receives an unload request, e.g., from the client 102, to unload the first tape cartridge 120A from the tape drive 130 and return the first tape cartridge 120A back to its associated slot address (slot 1). As shown in block 412, the storage system 100 queues the unload request in a queue system, that in one embodiment is maintained by the library CPU 136 and memory associated therewith. In an optional embodiment, the queue system can comprise a processor and memory, independent from the library CPU 136, adapted to perform the queuing steps discussed herein. As shown in block 414, the library 100 can respond to the client 102 that the unload request is complete prior to actually carrying out the unload request. In certain storage systems, the client 102 will not issue any additional requests until the client 102 has confirmation that the present request (in this case the unload request) is completed (i.e., requests that are serial). As shown in block 416, after receiving the "virtual" confirmation that the unload request was completed, the client 102 issues a second load request to the library 100 to move a second tape cartridge 120B from the associated logical address, to the tape drive 130 and load the second tape cartridge 120B therein to commence storage operations hereinafter for simplicity the logical address will be slot-2. At this point, the library 100 can manipulate the unload request and the second load request in a more efficient, time-saving, sequence of moves. In an embodiment, as shown in step 418, the second load request can be queued with the unload request with a further, optional, response to the client 102 that the second load request is completed, step 420, in order to alter the moves between the tape drive 130 and the shelf system 115. In the optional embodiment where the magazine 113 is being held near the tape drive 130 the question from step 416 is whether or not the second tape cartridge 120B is in the magazine 113 that is held near the tape drive 130, step 422. If the second tape cartridge is not in the magazine 113 being held by the tape drive 130 then move the magazine 113 back to the shelf system 115 (step 424) and move the new tape 120B disposed in a new magazine near the tape drive 130 (step 426).

With reference to FIG. 3A and continued reference to FIG. 4, the first depicted tape cartridge 120A is still in the tape drive 130 when the robotic transporter 124 brings the second depicted tape cartridge 120B to a location near the tape drive 130 via the magazine 113 (step 426). In certain embodiments, the location near the tape drive 130 is a position in which the robotic transport unit 124 is essentially stationary while the picker device 122 moves between the tape drive 130 and the magazine 113. As illustratively shown in FIG. 3A in conjunction with step 428, the picker device 122 grasps the first tape cartridge 120A and removes it from the tape drive 130 via the first picker 122A. The arrow indicates the direction of the picker device 122 moving towards the first tape cartridge 120A. As illustratively shown in FIG. 3B, the picker device 122 then moves to the magazine 113 to grasp the second tape cartridge 120B while still holding the first tape cartridge 120A (step 430). As illustratively shown in FIG. 3C, the second picker 122B has grasped the second tape cartridge 120B from the corresponding magazine slot 300, which is logically mapped as slot-2. As shown in step 432 in conjunction with FIG. 3D, the picker device 122 inserts the first tape cartridge 120A into the magazine 113 where the second tape cartridge 120B was previously disposed (magazine slot 300). After being disposed in the magazine 113, the slot 300, which now holds the first tape cartridge 120A, is remapped to logical address slot-1, which, as discussed earlier, corresponds to the first tape cartridge 120A. As shown in step 434 and FIG. 3E, after inserting the first tape cartridge 120A in the magazine 113, the picker device 122 moves the second tape cartridge 120B to the tape drive 130 and inserts the second tape cartridge 120B therein via the second picker 122B, whereby the second tape cartridge 120B becomes loaded in the drive 130 to form a cooperating read/write relationship. FIG. 3F shows the picker device 122 has completed operations. At this point, the robotic transporter 124 is free to move the magazine 113 back to the shelf system 115. In optional embodiments, the magazine 113 will remain next to the drive 130 awaiting new instructions from the host 102 in the event a tape 120 from that specific magazine 113 is instructed to be loaded in the drive 130 or a nearby drive. This process can essentially be repeated with each new request to unload a tape cartridge from a tape drive 130 and load a different tape cartridge in the tape drive 130, as shown by the flow diagram arrow going to step 410. In an optional embodiment, though the second tape cartridge 120B came from the slot 300, the first tape cartridge 120A is disposed in a different slot other than slot 300.

Figure 5A:
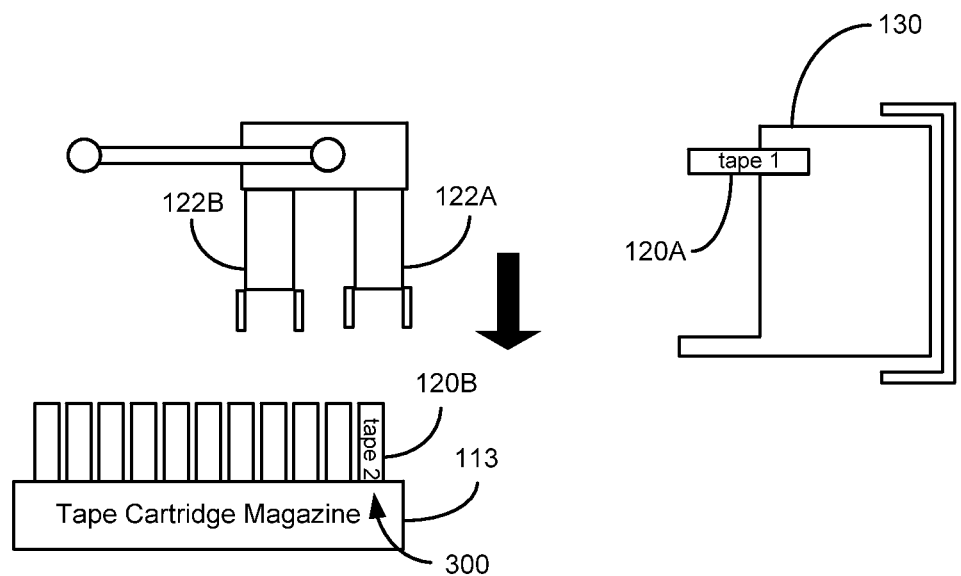
FIGS. 5A-5F are illustrations of an optional embodiment of a transporter and picker device possessing dual pickers cooperating with a data transfer device and a portable cartridge magazine constructed in accordance with an embodiment of the present invention.
Figure 5B:
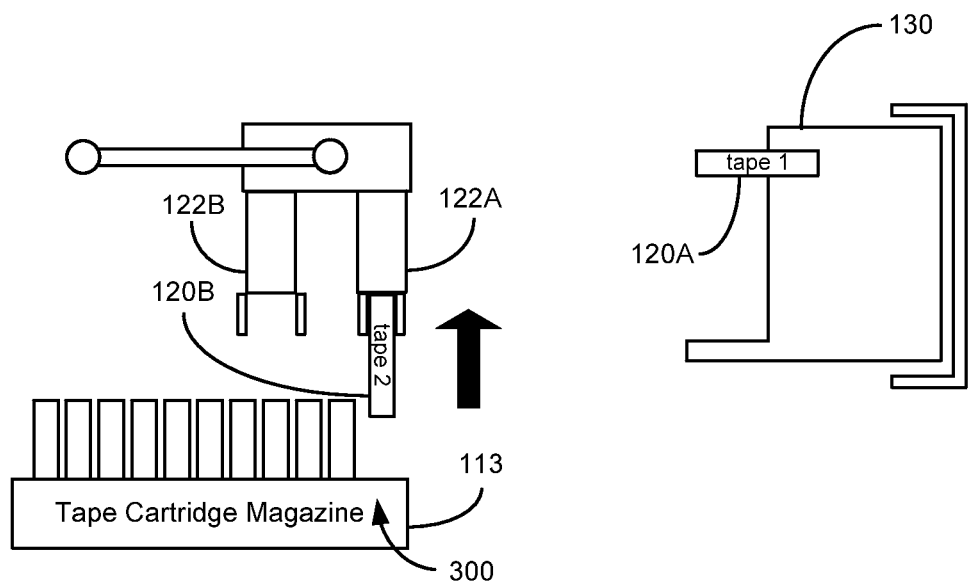
Figure 5C:
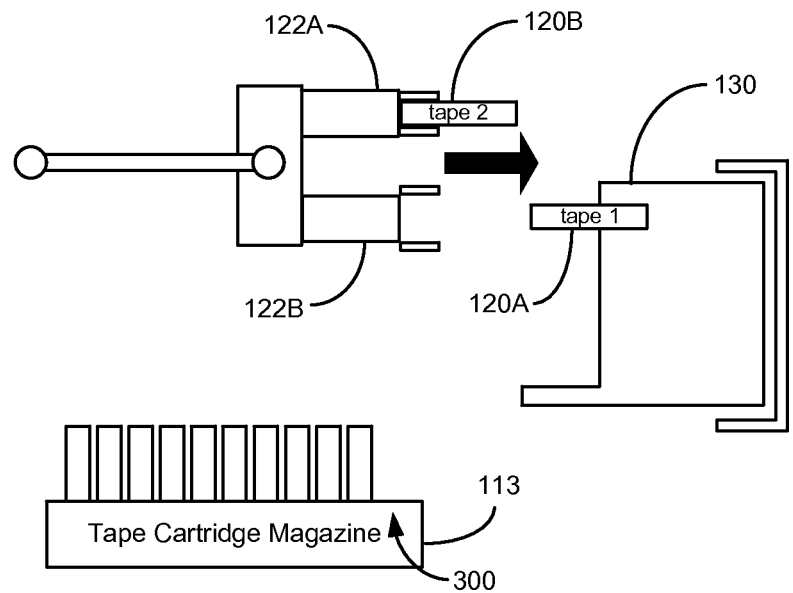
Figure 5D:
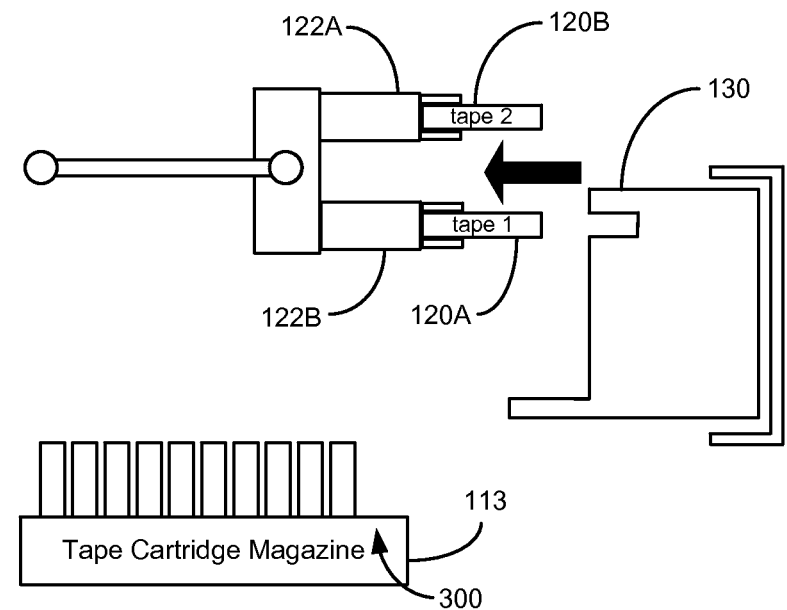
Figure 5E:
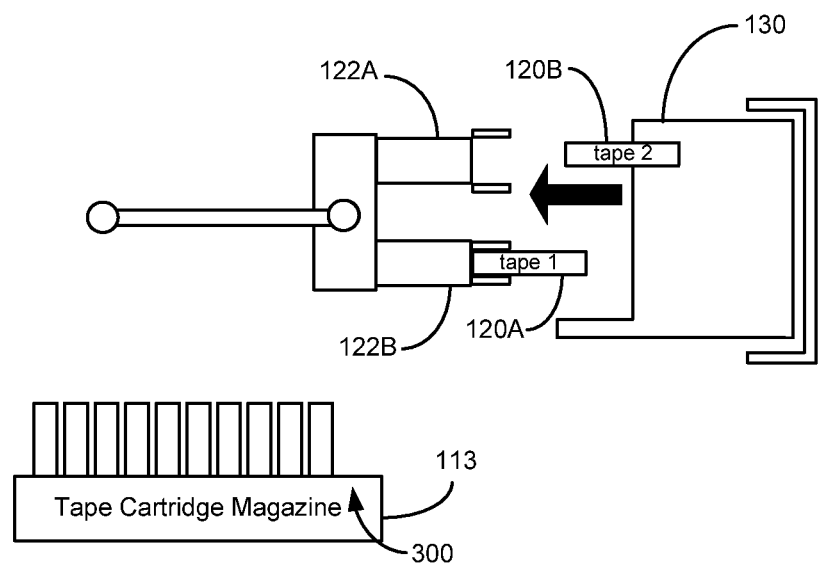
Figure 5F:
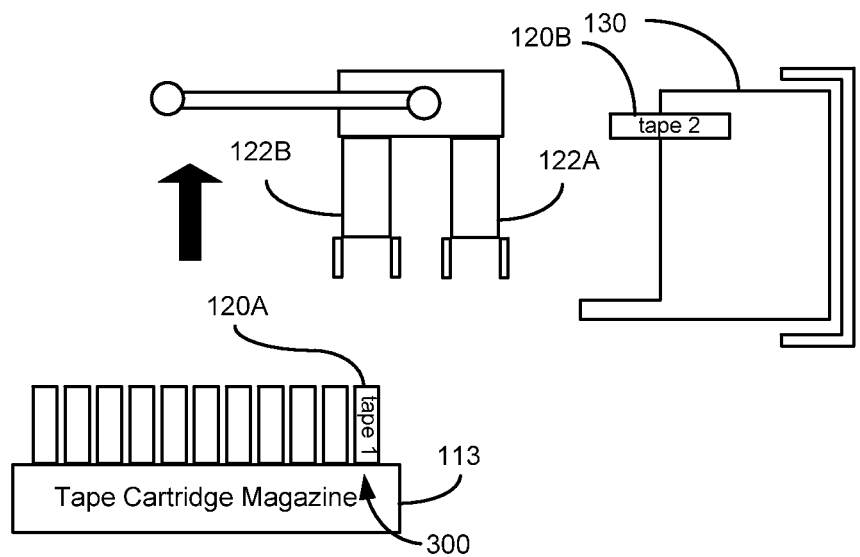
Figure 6:
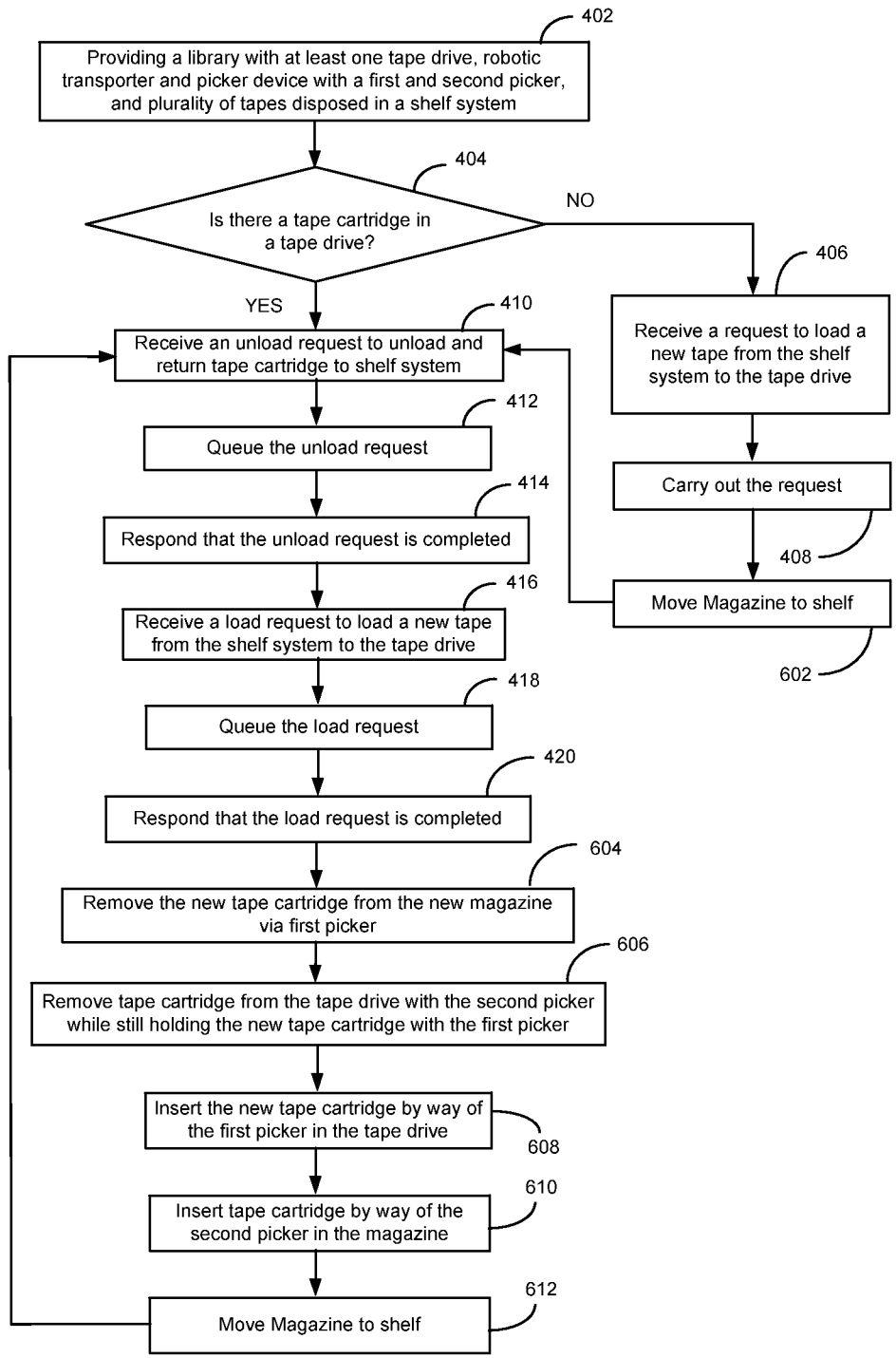
FIG. 6 is a block diagram of a method consistent with certain embodiments of the present invention.

In an optional embodiment, shown in FIGS. 5A-5F in conjunction with FIG. 6 and FIG. 1A, a requested second tape cartridge 120B is moved from the magazine 113 prior to the picker device 122 grasping the first tape cartridge 120A. The optional embodiment of FIG. 6 illustrates the magazine 113 being moved back to the shelf system 115 instead of being held by the tape drive 130, step 602. Otherwise, the steps are consistent with FIG. 4 up to step 420. In more detail, and shown in step 604 and FIG. 5A, after responding (in a virtual sense) that the load request is completed in step 420, the first picker 122A reaches for a the second tape cartridge 120B, located in the magazine 113 and grasps the second tape cartridge 120B via the first picker 122A, FIG. 5B. After withdrawing the second tape cartridge 120B from the magazine 113, the picker device 122 moves to the tape drive 130 with the first tape cartridge 120A whereby the second picker 122B grasps the first tape cartridge 120A and withdraws it from the drive 130, step 606 and FIGS. 5C and 5D. As shown in step 608 and FIG. 5E, once the first tape cartridge 120A is removed from the tape drive 130, the second tape cartridge 120B is inserted in the tape drive 130 via the first picker 122A. FIG. 5F and step 610 show the first tape cartridge 120A being inserted in the open slot 300 in the magazine 113 via the second picker 122B. In this embodiment, the open slot 300 is mapped to correspond to the slot address of the first tape cartridge 120A, in this case slot-1. Step 612 indicates that the magazine 113 is free to be moved back to the shelf system 115. This process can essentially be repeated with each new request to unload a tape cartridge from a tape drive 130 and load a different tape cartridge in the tape drive 130, as shown by the flow diagram arrow going to step 410.

Figure 7A:
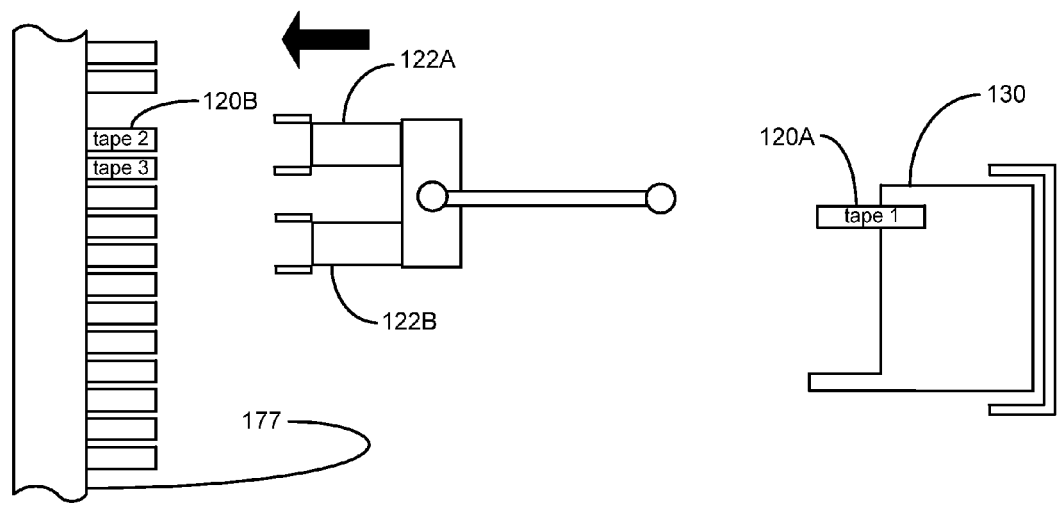
FIGS. 7A-7F are illustrations of an optional embodiment of a transporter and picker device possessing dual pickers used in the library of FIG. 1B constructed in accordance with an embodiment of the present invention.
Figure 7B:
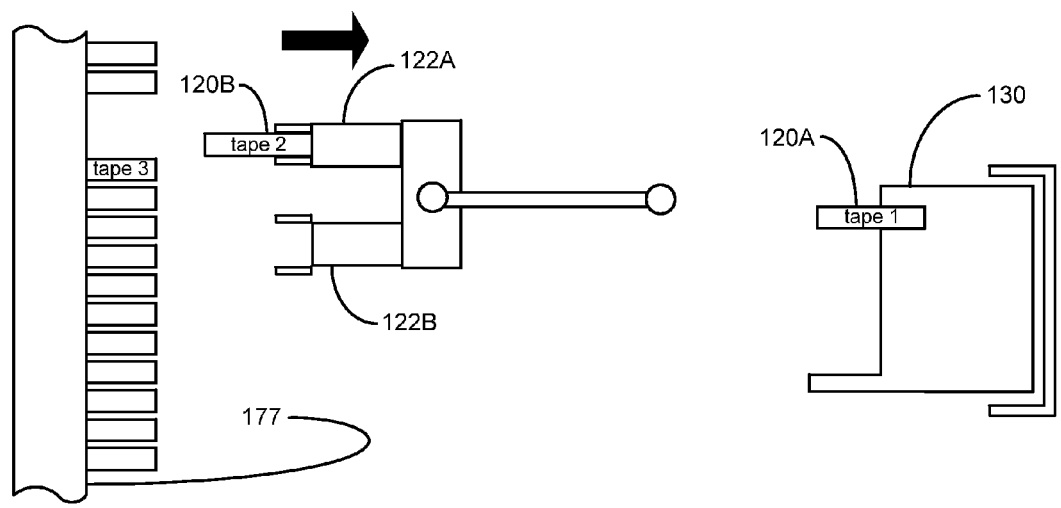
Figure 7C:
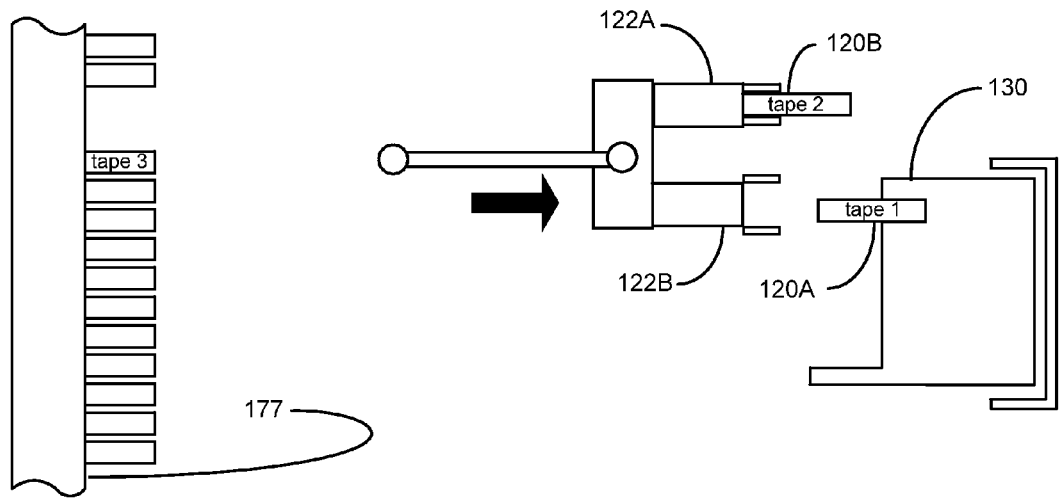
Figure 7D:
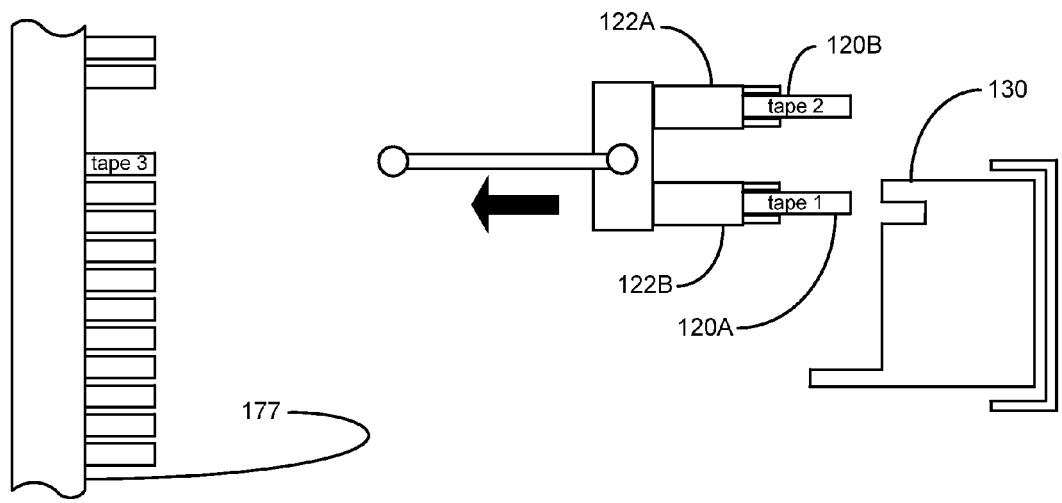
Figure 7E:
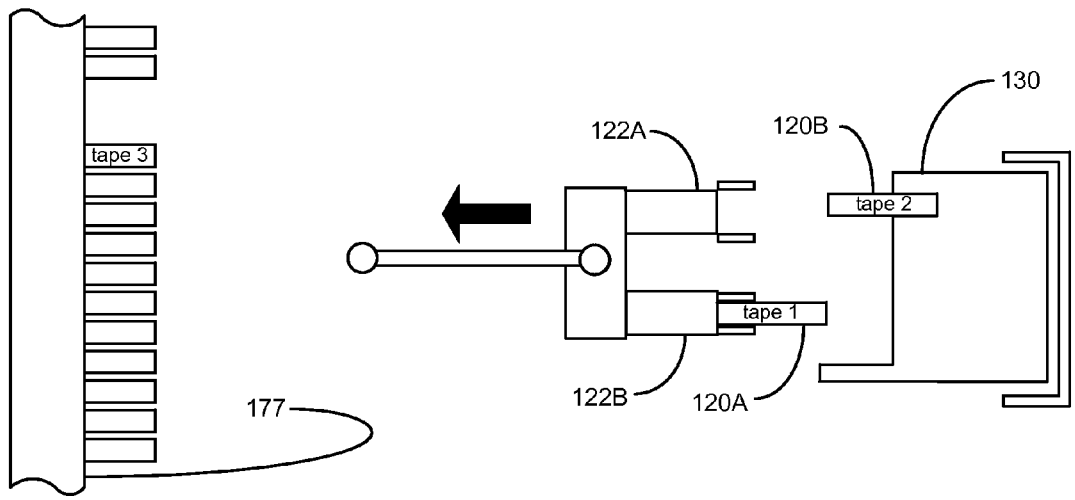
Figure 7F:
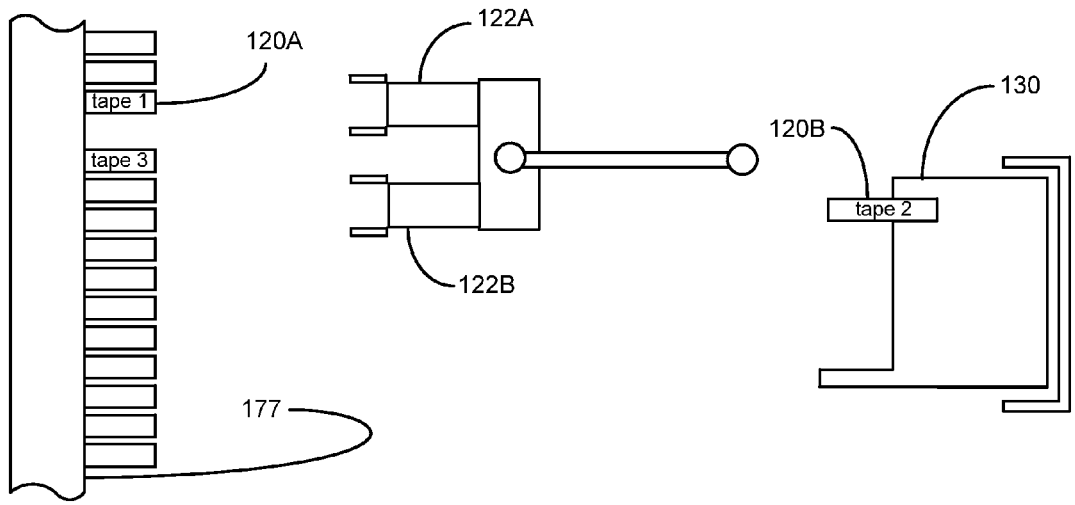
Figure 8:
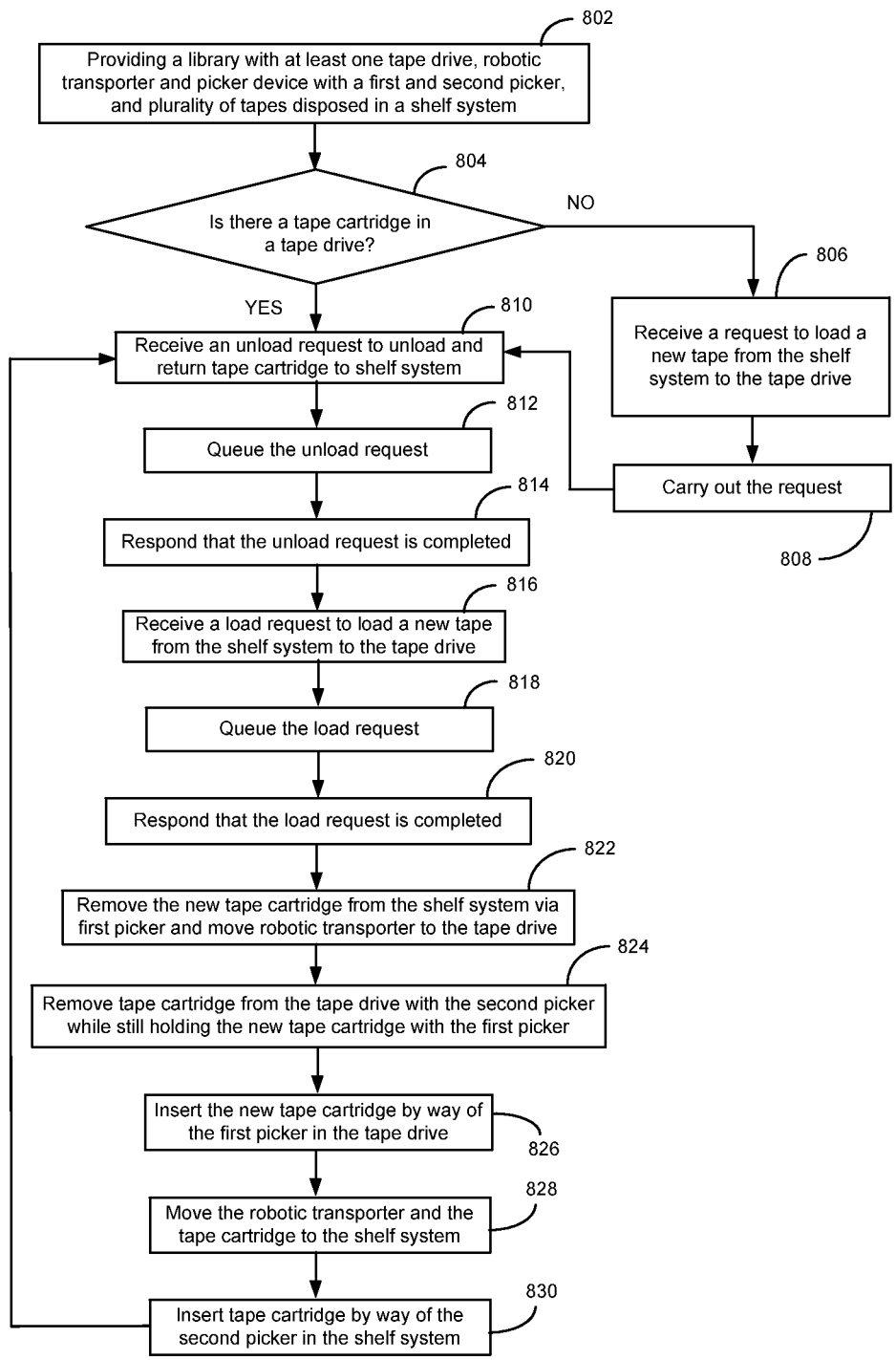
FIG. 8 is a block diagram of a method presented in FIGS. 7A-7F consistent with certain embodiments of the present invention.

FIG. 8 illustrates an embodiment of a method for efficiently moving tape cartridges 120 within a storage library 175 by essentially swapping a first tape cartridge 120A with a second tape cartridge 120B in relation to a commonly used a tape drive 130. FIG. 8 is described in conjunction with FIGS. 7A-7F and FIG. 1B. It should be recognized that the steps presented in the described embodiments of the present invention do not necessarily require any particular sequence unless otherwise stated. With reference to step 802 in conjunction with FIG. 1B, the library 175 is generally provided with a first tape drive 130A and a second tape drive 130B, a robotic transporter 124 with a picker device 122 having a first picker 122A and a second picker 122B, and a plurality of tape cartridges 120 disposed in a shelf system 177. A client 102 queries the library 175 to determine the library's configuration. As shown by the diamond 804, if there is a tape cartridge 120 present in a target tape drive 130, then proceed to step 810, otherwise proceed to step 806. Step 806 is a block showing the receipt of a request to move a first tape cartridge 120A from the associated slot in the shelf system 177 and load the first tape cartridge 120A in the tape drive 130. The first tape cartridge 120A is identified by the host 120 via an associated logical address, hereinafter, for simplicity, the logical address will be slot-1. The load request is simplified herein for ease of illustration, however, in actuality, there is a sequence of instructions that occurs, including identifying and moving the first tape cartridge 120A from the shelf system 177 (more specifically slot-1) to loading the first tape cartridge 120A in an engaged, cooperating relationship with the tape drive 130 ready to perform read/write operations, etc. Step 808 essentially carries out the request to move the first tape cartridge 120A from the shelf system 177 and load the first tape cartridge 120A in the tape drive 130. When the first tape cartridge 120A has completed all storage operations for the client 102, proceed to step 810. Here, the library 175 receives an unload request, e.g., from the client 102, to unload the first tape cartridge 120A from the tape drive 130 and return the first tape cartridge 120A back to its associated slot address (slot-1). As shown in block 812, the storage system 100 queues the unload request in a queue system, that in one embodiment is maintained by the library CPU 136 and memory associated therewith. As shown in block 814, the library 175 can respond to the client 102 that the unload request is complete prior to actually carrying out the unload request. In certain storage systems, the client 102 will not issue any additional requests until the client 102 has confirmation that the present request (in this case the unload request) is completed (i.e., requests that are serial). As shown in block 816, after receiving the "virtual" confirmation that the unload request is completed, the client 102 issues a second load request to the library 175 to move a second tape cartridge 120B from the associated logical address, to the tape drive 130 and load the second tape cartridge 120B therein to commence storage operations, hereinafter for simplicity the logical address will be slot-2. At this point, the library 175 can manipulate the unload request and the second load request in a more efficient, time-saving, sequence of moves. In an embodiment, as shown in step 818, the second load request can be queued with the unload request with a further, optional, response to the client 102 that the second load request is completed, step 820, in order to alter the moves between the tape drive 130 and the shelf system 177.

With respect to FIGS. 7A-7F, the requested second tape cartridge 120B is moved from the shelf system 177 prior to the picker device 122 grasping the first tape cartridge 120A, thus altering the received load/unload requests. In more detail, and shown in step 822 and FIG. 7A, after responding (in a virtual sense) that the load request is completed in step 820, the first picker 122A reaches for the second tape cartridge 120B, located in the shelf system 177 and grasps the second tape cartridge 120B via the first picker 122A, FIG. 7B. After withdrawing the second tape cartridge 120B from the shelf system 177, the picker device 122 moves to the tape drive 130 that still possesses the first tape cartridge 120A whereby the second picker 122B grasps the first tape cartridge 120A and withdraws it from the drive 130, step 824 and FIGS. 7C and 7D. As shown in step 826 and FIG. 7E, once the first tape cartridge 120A is removed from the tape drive 130, the second tape cartridge 120B is inserted in the tape drive 130 via the first picker 122A. FIG. 7F and step 828 show the first tape cartridge 120A being returned to the shelf system 177 wherein the first tape cartridge 120A is returned, step 830. In one embodiment, the open slot where the first tape cartridge 120A is disposed is remapped to correspond to the slot address of the first tape cartridge 120A, in this case slot-1. In an optional embodiment, the first tape cartridge 120A is disposed in the slot from where it came and no remapping is necessary. This process can essentially be repeated with each new request to unload a tape cartridge from a tape drive 130 and load a different tape cartridge in the tape drive 130, as shown by the flow diagram arrow going to step 810.

Figure 9:
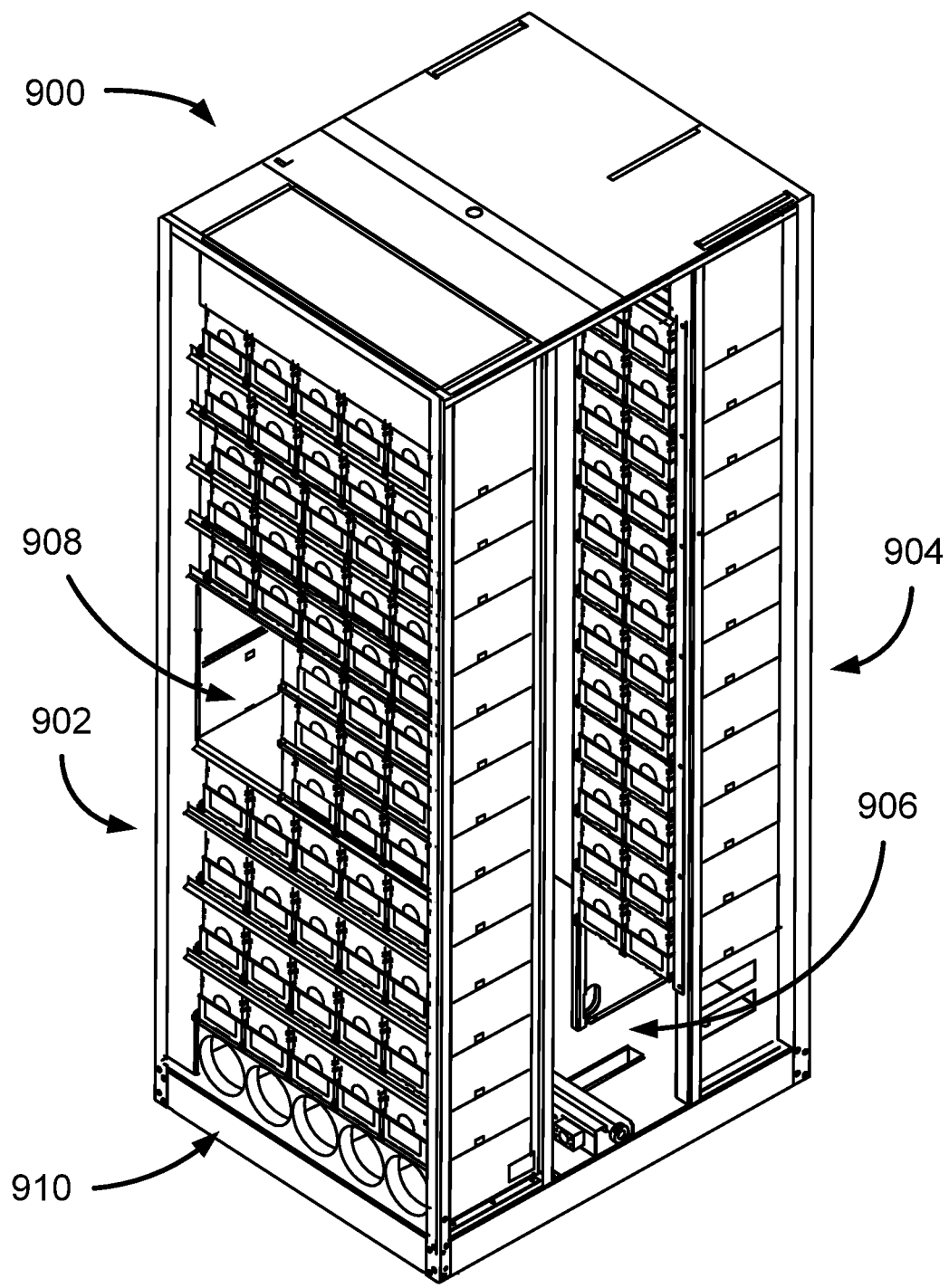
FIG. 9 is an illustration of a T-Finity library cabinet wherein embodiments of the present invention can be commercially practiced.

Embodiments of the present invention can be commercially practiced in a Spectra Logic T-Finity tape cartridge library manufactured by Spectra Logic of Boulder Colo. FIG. 9 shows a commercial embodiment of one T-Finity unit 900 without an enclosure, whereby the T-Finity unit 900 is a single cabinet whereby multiple cabinets can be combined to make an expandable library. The T-Finity unit 900 comprises a first and second shelf system 902 and 904 that are adapted to support a plurality of the mobile media, such as tape cartridge magazines 113 comprising a plurality of LTO-3 tape cartridges, archived by the library 900. The second shelf system 904 comprises at least one drive (not shown) adapted to read and write data to and from a tape cartridge. Functionally interposed between the first and second shelf system 902 and 904 is a magazine transport space 906. The magazine transport space 906 is adapted to provide adequate space for a tape cartridge magazine 113 to be moved, via a magazine transport (not shown) and cartridge picker device (not shown) that has dual pickers, from a position in the first shelf system 902, for example, to a drive. Tape cartridge magazines 113 can be transferred into and out from the T-Finity library via an entry/exit port 908. Transferring tape cartridge magazines 113 in and out of the T-Finity library can be accomplished by an operator for example. The T-Finity library comprises a means for cooling as shown by the fans 910, located at the base of the unit 900.

It is to be understood that even though numerous characteristics and advantages of various embodiments of the present invention have been set forth in the foregoing description, together with the details of the structure and function of various embodiments of the invention, this disclosure is illustrative only, and changes may be made in detail, especially in matters of structure and arrangement of parts within the principles of the present invention to the full extent indicated by the broad general meaning of the terms in which the appended claims are expressed. For example, multiple pickers 122A, 122B and 122C can be used to support multiple tape cartridges 120 while still maintaining substantially the same functionality without departing from the scope and spirit of the present invention. Another example can include using these techniques across multiple library partitions, to name a few examples while still maintaining substantially the same functionality without departing from the scope and spirit of the present invention. Further, though communication is described herein as between a client and the library, such as the library 100, communication can be received directly by addressable components, such as the first drive 130, via the interface device 106, for example, without departing from the scope and spirit of the present invention. Further, for purposes of illustration, a first and second tape drive and first and second tape cartridges are used herein to simplify the description for a plurality of tape drives and tape cartridges. Additionally, multiple robotic transporters can work together to enhance move efficiency. Further, different sequences using the dual picker 122 can be employed, such as, grasping a first tape cartridge 120A from a drive 130, then grasping a second tape cartridge 120B from a magazine 113 insert the second tape cartridge 120B while the picker device 122 is still holding the first tape cartridge 120A, then dispose the first tape cartridge 120A in the magazine 113, for example, without departing from the scope and spirit of the present invention. Finally, although the preferred embodiments described herein are directed to tape cartridge systems, such as the tape cartridges and tape storage systems, such as a tape library and tape drives, and related technology, it will be appreciated by those skilled in the art that the teachings of the present invention can be applied to other systems, such as solid state media adapted to be moved or other storage related "cartridges", without departing from the spirit and scope of the present invention.

It will be clear that the present invention is well adapted to attain the ends and advantages mentioned as well as those inherent therein. While presently preferred embodiments have been described for purposes of this disclosure, numerous changes may be made which readily suggest themselves to those skilled in the art and which are encompassed in the spirit of the invention disclosed and as defined in the appended claims.

What is claimed is:

1. A data storage library comprising:
   a picker device possessing a first picker and a second picker,
   said first picker, based on an ejection command, adapted to temporarily hold a first data cartridge after being ejected from a data transfer device and prior to being disposed in an accommodating physical slot while said second picker, based on a load command, is holding a second data cartridge prior to inserting the second data cartridge in said data transfer device;
   a queue system that holds both said load command and said ejection command, wherein said ejection command is received by said data storage library before said load command.

2. The data storage library of claim 1 wherein said accommodating slot is a slot in a portable data storage magazine.

3. The data storage library of claim 1 wherein said accommodating slot is in a shelf system comprised by said data storage library.

4. The data storage library of claim 1 wherein said second data cartridge resides in a first magazine slot in said magazine prior to being inserted in said data transfer device and said first data cartridge is disposed in said first magazine slot, said first magazine slot is identifiable by a second address associated with said second data cartridge when said second data cartridge is disposed therein but said first magazine slot is identifiable by a first address when said first data cartridge is disposed therein.

5. The data storage library of claim 4 wherein a map associating said first magazine slot with said second address is maintained by said data storage library.

6. The data storage library of claim 5 wherein a host computer identifies said first slot as said second address based on said map.

7. The data storage library of claim 1 wherein said first picker and said second picker are not identifiable via a host computer.

8. A method comprising:
   providing a data storage library that comprises a picker device that is moved within said data storage library via a robotic transporter;
   grasping a first portable data cartridge in a first picker while a second portable data cartridge is being held by a second picker, said first picker and said second picker are integrated in said picker device;
   disposing said first portable data cartridge in a data cartridge slot;
   coupling said second portable data cartridge with a data transfer device;
   after said disposing and inserting steps are complete, said first picker is no longer grasping said first portable data cartridge and said second picker is no longer grasping said second portable data cartridge;
   (a) receiving a first instruction from a host to unload said first portable data cartridge from said data transfer device and dispose said first portable data cartridge in a first data cartridge slot;
   (b) queuing said first instruction;
   (c) replying to said host that said first instruction is carried out, even though said first instruction has only been queued;
   (d) receiving a second instruction to move said second portable data cartridge from a second data cartridge slot and load said second portable data cartridge in said data transfer device; and
   (e) moving said second portable data cartridge in a position near said data transfer device via said second picker, said steps are in order from (a) to (e).

9. The method of claim 8 wherein said first portable data cartridge was located in said data transfer device when grasped by said first picker and while said second picker is holding said second portable data cartridge.

10. The method of claim 9 wherein said data cartridge slot is located in a shelf system comprised by said data storage library.

11. The method of claim 9 wherein said data cartridge slot is located in a portable data cartridge magazine.

12. The method of claim 8 wherein said second portable data cartridge was located in said data cartridge slot when grasped by said second picker and while said first picker is holding said first portable data cartridge.

13. The method of claim 8 wherein said robotic transporter is held essentially stationary while said pickers grasp and release said first and said second portable data cartridges.

14. The method of claim 8 wherein said data cartridge slot is identified by a host via a first logical address associated with said first portable data cartridge when said first portable data cartridge is disposed therein and wherein said data cartridge slot is identified by said host via a second logical address associated with said second portable data cartridge when said second portable data cartridge is disposed therein.

15. The method of claim 8 wherein said portable data cartridge is a tape cartridge and said data transfer device is a tape drive.

16. The method of claim 8 wherein said robotic transporter is controlled via a controller, the controller receives move instructions from a processor, the move instructions are maintained in a storage device, all of which are comprised by said data storage library.

17. A method comprising:
   providing a data storage library that comprises a picker device that is moved within said data storage library via a robotic transporter, said picker device possessing a first picker and a second picker;
   receiving a first instruction from a host to unload a first portable data cartridge from a data transfer device and dispose said first portable data cartridge in a first data cartridge slot;

queuing said first instruction;

replying to said host that said first instruction is carried out, even though said first instruction has only been queued;

receiving a second instruction to move a second portable data cartridge from a second data cartridge slot and load said second portable data cartridge in said data transfer device after said replying step;

grasping said second portable data cartridge via said second picker;

moving said second portable data cartridge in a position near said data transfer device;

removing said first portable data cartridge from said data transfer device via said first picker while said second picker is holding said second portable data cartridge;

inserting said second portable data cartridge in said data transfer device via said second picker; and disposing said first portable data cartridge in said first data cartridge slot.

18. The method of claim 17 wherein a common physical data cartridge slot is logically addressed as said first data cartridge slot when accommodating said first portable data cartridge and said common physical data cartridge slot is logically addressed as said second data cartridge slot when accommodating said second portable data cartridge.

19. The method of claim 18 wherein said common physical slot is located in a portable data cartridge magazine that is adapted to hold a plurality of portable data cartridges and said robotic transporter is adapted to move said portable data cartridge magazine from a shelf system in said data storage library to a position near said data transfer device.

* * * * *